(12) United States Patent
Kellner et al.

(10) Patent No.: US 12,288,431 B2
(45) Date of Patent: Apr. 29, 2025

(54) MOTOR VEHICLE AND A MONITORING METHOD

(71) Applicant: Dr. Ing. h.c. F. Porsche Aktiengesellschaft, Stuttgart (DE)

(72) Inventors: Philipp Kellner, Renningen (DE);
Teiwen Fehse, Stuttgart (DE);
Christopher Volkmer,
Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 505 days.

(21) Appl. No.: 17/752,933

(22) Filed: May 25, 2022

(65) Prior Publication Data

US 2022/0392281 A1    Dec. 8, 2022

(30) Foreign Application Priority Data

Jun. 7, 2021   (DE) .......................... 102021114542.2

(51) Int. Cl.
*B60L 3/00* (2019.01)
*B60L 3/12* (2006.01)
(Continued)

(52) U.S. Cl.
CPC .......... *G07C 5/0825* (2013.01); *B60L 3/0046* (2013.01); *B60L 3/12* (2013.01);
(Continued)

(58) Field of Classification Search
CPC ........ G07C 5/0825; G07C 5/085; B60K 1/04; B60K 2001/0483; B60K 2001/0455;
(Continued)

(56) References Cited

U.S. PATENT DOCUMENTS

| 4,901,575 A | * | 2/1990 | Bohannan | ........... G01M 5/0008 73/594 |
| 4,956,999 A | * | 9/1990 | Bohannan | ............... G01N 29/14 73/594 |

(Continued)

FOREIGN PATENT DOCUMENTS

| DE | 102016103411 A1 | * | 8/2017 | | |
| DE | 102018129158 A1 | * | 5/2020 | ............... | B60K 1/04 |
| DE | 102019119996 A1 | * | 1/2021 | | |

*Primary Examiner* — Jeffrey P Aiello
(74) *Attorney, Agent, or Firm* — Buchanan Ingersoll & Rooney PC

(57) ABSTRACT

A motor vehicle, in particular an at least partly electrically driven motor vehicle, has a battery device with at least one battery cell. The battery device is arranged in a floor region of the motor vehicle and has a protective device for protecting the battery device from mechanical action. The protective device has a protective plate, which is arranged in such a way that it covers the battery device at least in some regions, so that any mechanical actions are absorbed by the protective plate. The protective device also has an acoustic monitoring device, which monitors the protective plate acoustically and with which a signal can be output when a noise characteristic of a mechanical impairment of the protective plate is registered. Also disclosed is a method for monitoring the protective device.

16 Claims, 4 Drawing Sheets

Figure 1:
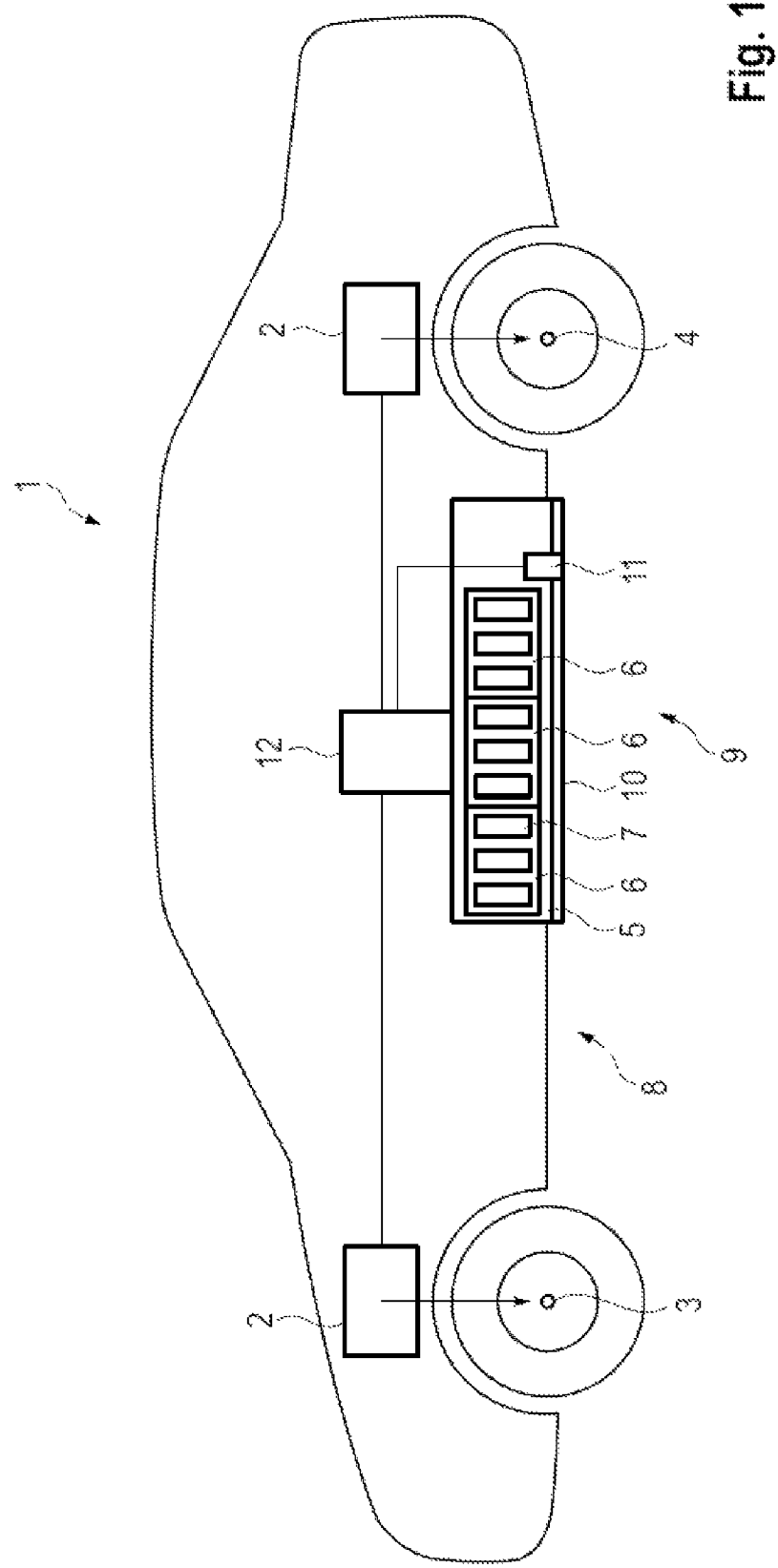

(51) Int. Cl.
    *B62D 25/04*     (2006.01)
    *B62D 25/20*     (2006.01)
    *B62D 29/04*     (2006.01)
    *G07C 5/08*     (2006.01)
    *B60K 1/04*     (2019.01)
    *H04M 11/04*     (2006.01)

(52) U.S. Cl.
    CPC ....... *B62D 25/2072* (2013.01); *B62D 29/041* (2013.01); *G07C 5/085* (2013.01); *B60K 1/04* (2013.01); *B60K 2001/0438* (2013.01); *H04M 11/04* (2013.01)

(58) Field of Classification Search
    CPC .... B60K 2001/0466; B60K 2001/0472; B60L 2270/142; B60L 2270/145; B60L 2270/14; B60L 2270/00; B60L 3/0007; B60L 3/0023; B60L 3/0046; B60L 3/0038; B60L 3/0061; B60L 3/12; B60L 50/60; B60L 50/66; B60L 50/00; B60L 50/50; B60Y 2306/01; B60Y 2306/00; B62D 25/2072; B62D 29/04; B62D 29/041; H01M 10/04; Y02T 10/70
    USPC ........... 73/587, 12.01, 602, 600; 324/207.14, 324/216; 340/455, 438, 425.5; 700/110, 700/108; 702/63, 183, 38, 39, 41, 104, 702/103, 179, 182, 188, 31, 32, 35, 36, 702/56, 57, 81
    See application file for complete search history.

(56) References Cited

U.S. PATENT DOCUMENTS

| | | |
|---|---|---|
| 11,217,831 B2 | 1/2022 | Fritz et al. |
| 2005/0011249 A1* | 1/2005 | Mahaffey ................ G01M 7/08 <br> 702/81 |
| 2012/0203487 A1* | 8/2012 | Johnson ............... G01C 25/005 <br> 702/141 |
| 2016/0073583 A1* | 3/2016 | Reich ........................ G01L 1/00 <br> 702/41 |
| 2020/0161717 A1* | 5/2020 | Fritz ................... H01M 10/613 |
| 2021/0237578 A1* | 8/2021 | Ing ........................ B60L 3/0069 |

* cited by examiner

MOTOR VEHICLE AND A MONITORING METHOD

CROSS-REFERENCE TO RELATED APPLICATION

This application claims priority to German Patent Application No. 10 2021 114 542.2, filed Jun. 7, 2021, the content of such application being incorporated by reference herein in its entirety.

FIELD OF THE INVENTION

The invention relates to a motor vehicle with a protective device and a method for monitoring the protective device, in particular to a motor vehicle with a battery device and a protective device for protecting the battery device, and to a method for monitoring the protective device of a battery device.

BACKGROUND OF THE INVENTION

Motor vehicles with an electric motor as the prime mover, that is to say for example electric vehicles or hybrid vehicles, that is to say electrically driven or partly electrically driven motor vehicles, have an electric motor and a battery device. The battery device stores electrical energy that can be charged, for example by means of an electrical connection to a charging network and/or by recovery of kinetic energy, for example when braking or driving downhill. This stored electrical energy can be used by means of the electric motor to drive the motor vehicle.

In such motor vehicles, the battery device is increasingly being placed in an underfloor arrangement in the underbody or below the underbody, so that the battery device is in some cases directly integrated in the vehicle floor, forms the vehicle floor or is arranged underneath the vehicle floor.

DE 10 2016 103 411 A1, which is incorporated herein by reference, discloses a motor vehicle with a battery device with battery modules which are arranged in a receiving device which, viewed from below, is covered by a plate for protecting the battery device in order to protect the battery device from impacts from below. The plate serves here as a protective device to protect the battery against stones or other objects thrown against it, and in the event of contact with the road or other objects, etc., so that any mechanical impacts from below on the motor vehicle do not act on the battery device, but on the plate arranged to protect the battery device.

With the vehicle in motion, it is not possible to assess the severity of the mechanical impact on the panel, whether and how the panel was damaged, or even whether the battery device covered by the panel was affected and damaged. Also, the plate is typically mounted so low on the motor vehicle that it is not visible to the driver of the motor vehicle when the vehicle is in motion and is difficult to inspect even when the vehicle is stationary. Thus, it seems highly likely that damage to the plate will go unnoticed and thus, in the event of subsequent further mechanical impairment, will no longer satisfy the requirements for protecting the battery device and may thus even damage the battery device. Also, in the case of severe mechanical deterioration, it is possible that in addition to damage to the plate, the battery device may also be damaged at the same time, which would go unnoticed initially, until the battery device itself shows defects, such as electrical defects or thermal effects due to the damage. In such situations, however, the damage to the battery device may have already caused consequential damage or events that are undesirable.

SUMMARY OF THE INVENTION

Described herein is a motor vehicle with a protective device and a method for monitoring the protective device which allows any damage to the protective device to be detected immediately, on the one hand in order to be able to promptly initiate a check of the protective device, but on the other hand also in order to prevent damage to the battery device in the event of a second mechanical impairment when the protective device is already damaged.

One exemplary embodiment of the invention relates to a motor vehicle, in particular an at least partly electrically driven motor vehicle, having a battery device with at least one battery cell, the battery device being arranged in particular in a floor region of the motor vehicle, furthermore having a protective device for protecting the battery device from a mechanical action, the protective device having a protective plate, which is arranged in such a way that it covers the battery device at least in some regions, so that any mechanical effects are absorbed by the protective plate, and an acoustic monitoring device being provided, which monitors the protective plate acoustically and with which a signal can be output when a noise characteristic of mechanical impairment of the protective plate is registered. In this way, the protective plate is acoustically monitored, with a noise being generated when a mechanical action occurs, such as contact or a bumping against the protective plate, etc., and the noise being monitored. If the action is so violent that a noise characteristic of the protective plate is produced, a signal is output which indicates a correspondingly stronger mechanical action producing such a characteristic noise. Accordingly, subsequent actions can be initiated if desired.

In an advantageous exemplary embodiment, it is expedient if, on the basis of the signal, a driver warning and/or a fault memory entry and/or a workshop notification and/or a fire department notification and/or an emergency call and/or warning signals to surrounding road users and/or a disconnection of a high-voltage connection and/or an activation of a hazard warning light system can be carried out automatically. Accordingly, damage to the protective plate and/or the battery device can be indicated or further measures can be taken and/or prepared.

Also, in a further exemplary embodiment, it is advantageous if the acoustic monitoring device comprises at least one sound sensor and/or acoustic sensor and/or a microphone, which monitors or monitor the protective plate. This allows the characteristic noise to be measured directly, for example by structure-borne sound or airborne sound, etc. Also, a plurality of such sensors or microphones can be provided and can be arranged at different locations, in order to better monitor more distant regions or portions of the protective plate, as necessary.

It is also expedient if the acoustic monitoring device is arranged adjacently to the protective plate, on the protective plate and/or at a defined distance from the protective plate and/or is integrated in the protective plate, for example, in particular, at least one sound sensor and/or acoustic sensor and/or a microphone is or are arranged adjacently to the protective plate, on the protective plate and/or at a defined distance from the protective plate and/or is or are integrated into the protective plate. As a result, the characteristic noise of the protective plate can be better detected.

Further, it is expedient if the protective plate is a multilayer plate having at least three layers lying adjacently to one another, having two outer layers and having at least one inner layer disposed between the two outer layers, the at least one inner layer being configured to be compressible and to produce, upon compression, a characteristic noise which is monitorable. Thus, the protective plate is monitorable for compression or degradation of the inner layer that produces the characteristic noise. The number of inner layers and their material tuning can also produce more than one characteristic noise, depending on which inner layer is impaired.

It is particularly advantageous if the two outer layers consist of a substantially non-compressible material and the at least one inner layer consists of a compressible material, or if a plurality of inner layers are provided which consist of a compressible material, in particular consist of a different compressible material. Accordingly, a material may be selected for the inner layer such that a characteristic noise is generated when mechanically impaired, or different materials may be selected for the selected inner layers such that a correspondingly different characteristic noise is generated depending on the layer that is impaired.

It is also expedient if two outer layers consist of fiber-reinforced plastic as a non-compressible material and the at least one inner layer consists of a foam material as a compressible material, or the plurality of inner layers are each made of a different foam material as a compressible material. The outer layers or one outer layer can also be made of a thin metal or of another plastics material, in particular without fiber reinforcement or with other reinforcement.

One exemplary embodiment of the invention relates to a method for monitoring a protective device of a battery device, in particular of a motor vehicle, in particular of an at least partly electrically driven motor vehicle, the battery device having at least one battery cell, a protective device being provided for protecting the battery device from a mechanical action, the protective device having a protective plate which is arranged in such a way that it covers the battery device at least in some regions, so that any mechanical effects are absorbed by the protective plate, and an acoustic monitoring device being provided, the monitoring device monitoring the protective plate acoustically and, in the event of mechanical impairment of the protective plate, the monitoring device registering this mechanical impairment on the basis of a noise characteristic of the protective plate and outputting a signal. This makes it possible to monitor the protective plate so that an indication of damage in this respect can be provided and/or further actions can be prepared or initiated.

It is particularly advantageous if, on the basis of the signal, a driver warning and/or a fault memory entry and/or a workshop notification and/or a fire department notification and/or an emergency call and/or warning signals to surrounding road users and/or a disconnection of a high-voltage connection and/or an activation of a hazard warning light system is carried out automatically. As a result, measures can be taken, in particular to check the protective device and/or the battery device, or other warning and/or supporting measures can be taken.

It is particularly advantageous if the acoustic monitoring device comprises at least one sound sensor and/or acoustic sensor and/or microphone which acoustically monitors or monitor the protective plate, the signals of the monitoring device being evaluated to identify a characteristic noise. This makes the intended characteristic noise directly monitorable.

BRIEF DESCRIPTION OF THE DRAWING FIGURES

Figure 2:
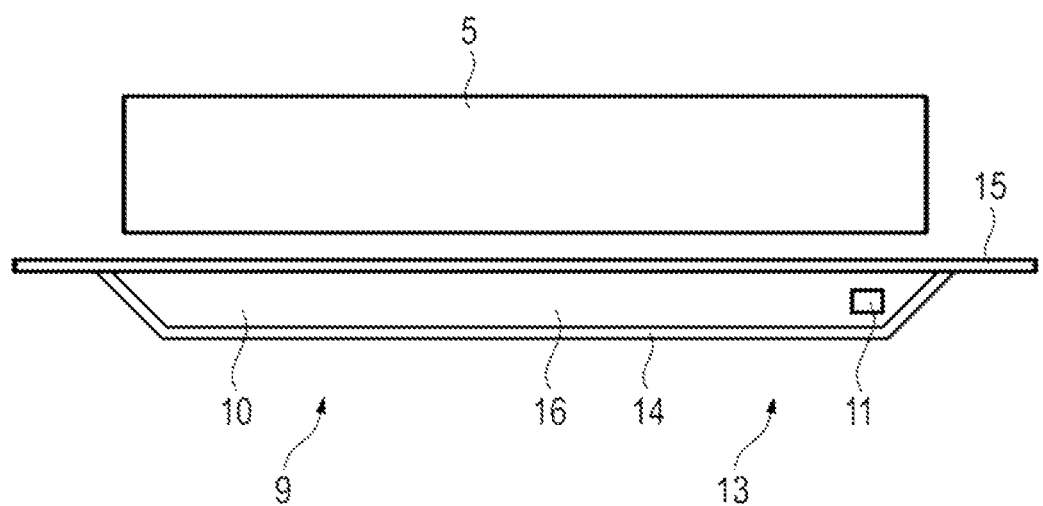
Figure 3:
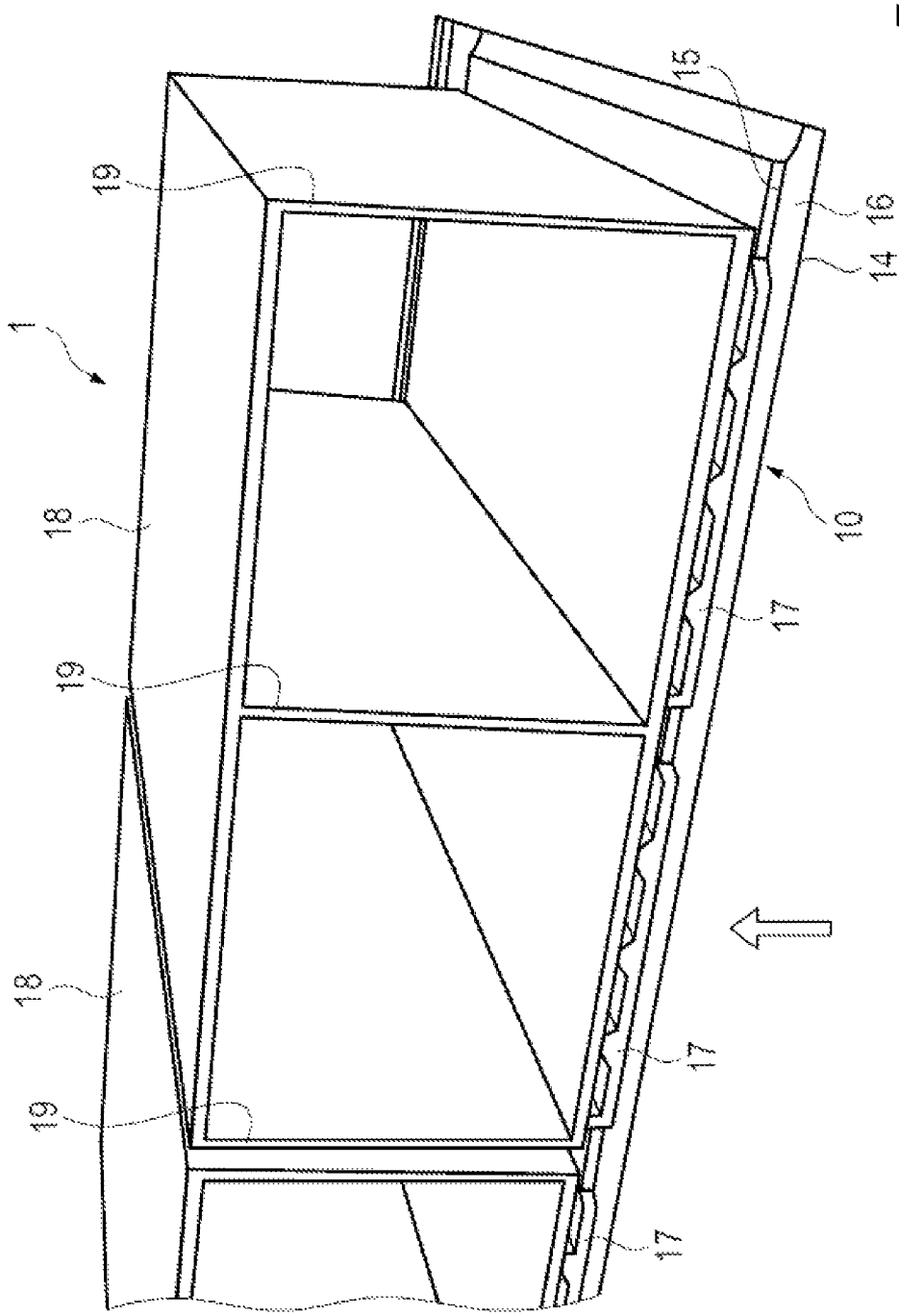
Figure 4:
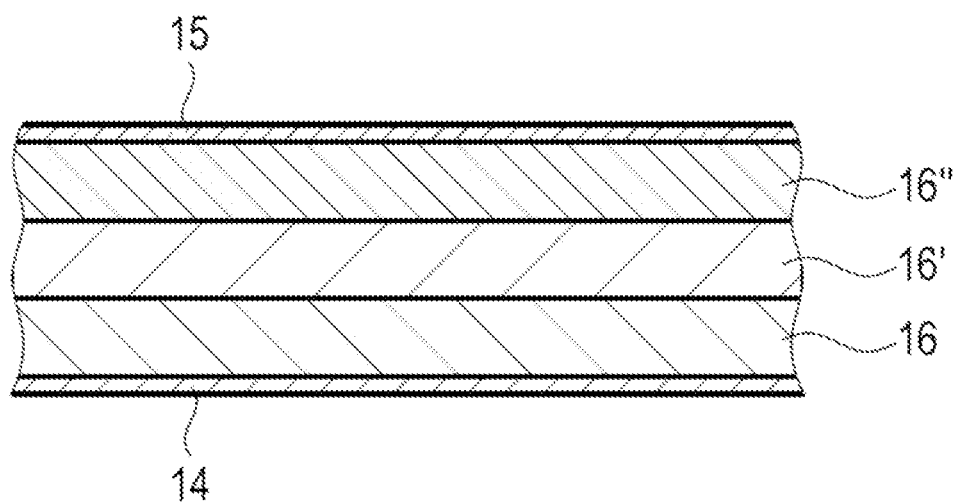

In the following, the invention is explained in detail on the basis of an exemplary embodiment with reference to the drawing. In the drawing:

FIG. 1 shows a schematic representation of a motor vehicle with a battery device, a protective device and a monitoring device, FIG. 2 shows a schematic sectional view of the battery device and the protective device, FIG. 3 shows a further schematic sectional view of a battery device with protective device, and FIG. 4 shows a schematic sectional view of a protective plate.

DETAILED DESCRIPTION OF THE INVENTION

FIG. 1 shows, in a schematic representation, a motor vehicle 1. The motor vehicle 1 is, for example, an at least partly electrically driven motor vehicle 1, such as an electric vehicle or a hybrid vehicle, plug-in hybrid or similar, with an electric motor 2 as prime mover and with a further motor as prime mover, such as an internal combustion engine. In the exemplary embodiment of FIG. 1, the motor vehicle 1 is provided with two electric motors 2 as prime movers, with one electric motor 2 being provided as a drive at the front axle 3 and another electric motor 2 being provided as a drive at the rear axle 4. Of course, it could also be that only one electric motor 2 is provided, which drives the wheels of the front axle 3 and/or the rear axle 4.

The motor vehicle is furthermore provided with a battery device 5 which has at least one battery cell 7 or at least one battery module 6 with at least one battery cell 7. In the exemplary embodiment shown, a plurality of battery modules 6 each with a plurality of battery cells 7 are shown schematically and symbolically.

The battery device 5 is preferably arranged in a floor region 8 of the motor vehicle 1 and is therefore exposed to external mechanical actions when the motor vehicle 1 contacts the ground or due to stone impact, etc.

A protective device 9 is provided to protect the battery device 5 from mechanical action. The protective device 9 has at least one protective plate 10. The protective plate 10 is arranged here in such a way that it covers the battery device 5 at least in some regions, so that any mechanical effects can be absorbed by the protective plate 10. FIG. 1 shows that the protective plate 10 is arranged in the floor region 8 of the motor vehicle 1 and extends below the battery device 5 and completely covers the battery device 5 on its underside. In this way, it can be achieved that mechanical actions coming from below are absorbed by the protective plate 10. It is also possible that the protective plate 10 is additionally or alternatively arranged on at least one side of the battery device 5 and/or above the battery device 5, depending on the direction from which the typical mechanical actions are expected and also depending on the arrangement of the battery device 5 in the motor vehicle 1.

Furthermore, an acoustic monitoring device 11 is provided, which acoustically monitors the protective plate 10. The acoustic monitoring device 11 has at least one sound sensor and/or acoustic sensor and/or microphone, which monitors or monitor the at least one protective plate 10. Furthermore, the monitoring device 11 is connected to or integrated with a control unit 12, which processes the signals recorded by the monitoring device 11 and derives and initiates measures therefrom.

Here, the protective plate 10 is formed in such a way that it can generate a characteristic noise in the event of mechanical impairment if the impairment exceeds a predefined level and the protective plate 10 is mechanically damaged in the process, for example.

Here, the protective plate 10 is, for example, a flat plate or a plate which is also modeled in three dimensions, which has a defined structure but is basically a rather two-dimensionally extended structure which is significantly larger in the surface dimension than in the direction perpendicular thereto. Also, the protective plate 10 can be a three-dimensional structure, such as a kind of housing cover or such as a kind of housing, etc.

If a characteristic noise is registered by the acoustic monitoring device 11 and is predefined as a characteristic noise of a mechanical impairment, a corresponding signal is thus output, which can be further processed to initiate predefined measures. To detect the characteristic noise, the acoustic monitoring device 11 preferably permanently or continuously records noises, optionally still processes these measured values, and compares them with predefined data of characteristic noises in order to decide whether a characteristic noise has occurred. Here, the processing and detection can optionally take place in the monitoring device 11 or in the control unit 12.

When a characteristic noise is detected on the basis of the signal generated as a result, the control unit 12 can automatically prepare, execute or initiate a driver warning and/or a fault memory entry and/or a workshop notification and/or a fire department notification and/or an emergency call and/or warning signals to surrounding road users and/or a disconnection of a high-voltage connection and/or an activation of a hazard warning light system. For this purpose, the control unit 12 can be connected to and/or integrated in other electronic units of the motor vehicle.

In this way, it can be achieved that, for example, the protective plate 10 is checked and replaced if damage is detected. Warnings or other measures can also be taken in the event that, for example, the battery device 5 is also damaged and a battery fire etc. is feared.

For monitoring the protective plate 10, the acoustic monitoring device 11 can be attached or arranged adjacently to the protective plate 10, on the protective plate 10 and/or arranged at a defined distance from the protective plate 10 and/or integrated in the protective plate 10. In particular, at least one sound sensor and/or acoustic sensor and/or a microphone or a plurality thereof can in each case be attached or arranged adjacently to the protective plate 10, on the protective plate 10 and/or arranged at a defined distance from the protective plate 10 and/or integrated in the protective plate 10.

FIG. 2 shows a schematic example of a battery device 5 and a protective device 9 with a protective plate 10. The monitoring device 11 is integrated in the protective plate 10.

The protective plate 10 is formed as a multilayer plate 13 with at least three layers 14, 15, arranged adjacently to one another. The multilayer plate 13 is formed with two outer layers 14, 15 and with at least one inner layer 16 arranged between the two outer layers 14, 15. Instead of the one inner layer 16, a plurality of inner layers 16, 16', 16" etc. can also be provided, see FIG. 4.

The at least one inner layer 16, 16', 16" is designed in such a way that it is compressible and during compression generates a characteristic noise, which can be monitored.

For example, the two outer layers 14, 15 consist of a substantially non-compressible material and the at least one inner layer 16 consists of a compressible material, for example, or the plurality of inner layers 16, 16', 16" consist each of a different compressible material. As a result, the one inner layer 16 may generate a characteristic noise or the inner layers 16, 16', 16" may each generate respective characteristic noises, which can be monitored and registered.

Particularly preferably, the two outer layers 14, 15 consist, for example, of fiber-reinforced plastic as a non-compressible material. Furthermore, particularly preferably, the at least one inner layer 16 consists of a foam material as compressible material or the plurality of inner layers 16, 16', 16" each consist of a different foam material as compressible material.

FIG. 3 shows a schematic illustration of a battery device 5, but only with the housings 18 of battery modules 6 and without battery cells 7, which are still to be inserted in the housings 18. Cooling plates 17 are arranged between the protective plate 10 and the housings 18 and are intended to effect cooling of the battery modules 6. The protective plate 10 is arranged below the cooling plates 17 and covers them. The housings 18 can advantageously be connected to the body of the motor vehicle 1, for example are screwed together.

The method according to aspects of the invention provides for acoustic monitoring of the protective plate 10 by means of the monitoring device 11, wherein, in the event of mechanical impairment of the protective plate 10, the monitoring device 11 registers this mechanical impairment on the basis of a sound characteristic of the protective plate 10 and outputs a signal.

Thus, based on the signal, a driver warning and/or a fault memory entry and/or a workshop notification and/or a fire department notification and/or an emergency call and/or warning signals to surrounding road users and/or a disconnection of a high-voltage connection and/or an activation of a hazard warning light system can be carried out automatically.

The battery device 5 is advantageously a high-voltage battery device for voltages greater than 60V, in particular in the range of 400V to 800V or more.

From the characteristic noise, the type of mechanical impairment and its extent can be estimated. Thus, it can also be estimated whether the protective plate 10 has bumped against the battery device 5 and/or the cooling plate 17 and with what force or strength. Here, the deformation noise of the inner layer 16 or the inner layers 16, 16', 16" may also vary depending on speed and/or area, and this can be taken into account.

The cooling plate 17 or plurality of cooling plates 17 are preferably arranged between the battery device 5 and the protective plate 10.

If different inner layers 16, 16', 16" are used, it is preferred if the stiffnesses of the individual inner layers 16, 16', 16" are different and each inner layer 16, 16', 16" produces a different characteristic noise. This makes it particularly advantageous to infer the degree or force of mechanical impairment on the protective plate 10, the cooling plate 17 and/or the battery device 5.

It is also particularly advantageous if the protective plate 10 is designed as a sealed body as a whole, so that the inner region is sealed by the outer two layers 14, 15 from dirt and water. In this way, the monitoring device 11 and/or the sensors and/or microphones can also be arranged in a protected manner, in particular protected from dirt and/or water.

It is also preferred if the protective plate 10 rests against the battery device 5 in some regions and is arranged at a distance from the battery device 5 in other regions. The protective plate 10 can also lie completely against the battery device 5 or can be arranged completely spaced apart. Spacing is preferably favorable where the battery device 5 has a vertical structure; see the vertical walls 19 in FIG. 3.

If a characteristic noise is registered, the monitoring device 11 and/or the control unit 12 can output various information and/or instructions, and these may well be output in a tiered manner, depending on the degree of impairment, for example:

level 1: inspect and/or replace the protection plate 10 at the next service, for example if the protective plate 10 is damaged, level 2: visit a workshop, for example if the cooling system is damaged, level 3: switch off the motor vehicle, for example if the battery device is damaged, level 4: immediately park and leave the motor vehicle, for example in the event of relevant damage to the battery device.

It is also advantageous if the stiffness of the battery device 5 and/or the cooling plate 17 and/or the protective plate 10 are matched to each other in such a way that the various states of damage in levels 1 to 4 can be easily distinguished from each other.

LIST OF REFERENCE SIGNS 1 motor vehicle
2 electric motor
3 front axle
4 rear axle
5 battery device
6 battery module
7 battery cell
8 floor region
9 protective device
10 protective plate
11 monitoring device
12 control unit
13 multilayer plate
14 outer layer
15 outer layer
16 inner layer
16' inner layer
16" inner layer
17 cooling plate
18 housing
19 walls

What is claimed:

1. An at least partly electrically driven motor vehicle comprising:
a battery device with at least one battery cell arranged in a floor region of the motor vehicle; and
a protective device for protecting the battery device from mechanical action, the protective device including (i) a protective plate, which is arranged to cover the battery device at least in some regions, so that any mechanical effects are absorbed by the protective plate, wherein the protective plate is a multilayer plate with at least three layers arranged adjacent to one another, with two outer layers and with at least one inner layer arranged between the two outer layers, and the at least one inner layer being configured to be compressed and, during compression, generates a noise characteristic of mechanical impairment of the protective plate, and (ii) an acoustic monitoring device that monitors the protective plate acoustically and is configured to output a signal when the noise characteristic of mechanical impairment of the protective plate is registered.

2. The motor vehicle as claimed in claim 1, wherein, on the basis of the signal, the motor vehicle is configured to automatically carry out a driver warning and/or a fault memory entry and/or a workshop notification and/or a fire department notification and/or an emergency call and/or warning signals to surrounding road users and/or a disconnection of a high-voltage connection and/or an activation of a hazard warning light system.

3. The motor vehicle as claimed in claim 1, wherein the acoustic monitoring device comprises at least one sound sensor and/or acoustic sensor and/or microphone which monitors the protective plate.

4. The motor vehicle as claimed in claim 1, wherein at least one sound sensor and/or acoustic sensor and/or microphone of the acoustic monitoring device is or are arranged adjacently to the protective plate, on the protective plate and/or at a defined distance from the protective plate and/or is or are integrated in the protective plate.

5. The motor vehicle as claimed in claim 1, wherein the two outer layers comprise a substantially non-compressible material and the at least one inner layer comprises a compressible material.

6. The motor vehicle as claimed in claim 5, wherein the at least one inner layer comprises a plurality of inner layers each including a different compressible material.

7. The motor vehicle as claimed in claim 6, wherein the two outer layers comprise fiber-reinforced plastic as a non-compressible material and the plurality of inner layers each comprises a different foam material as a compressible material.

8. The motor vehicle as claimed in claim 1, wherein the two outer layers comprise fiber-reinforced plastic as a non-compressible material and the at least one inner layer comprises a foam material as a compressible material.

9. The motor vehicle as claimed in claim 1, wherein the acoustic monitoring device is embedded within the compressible layer of the protective plate.

10. The motor vehicle as claimed in claim 1 further comprising a cooling plate sandwiched between the protective device and the battery device.

11. The motor vehicle as claimed in claim 1, wherein the substantially non-compressible material has a lower compressibility than the compressible material.

12. The motor vehicle as claimed in claim 1, wherein the protective device is sealed from contaminants.

13. The motor vehicle as claimed in claim 1, wherein the acoustic monitoring device is attached to the protective plate.

14. A method for monitoring a protective device of a battery device of an at least partly electrically driven motor vehicle, the motor vehicle including (a) the battery device including at least one battery cell, and (b) a protective device having (i) a protective plate which is arranged to cover the battery device at least in some regions, so that any mechanical actions are absorbed by the protective plate, wherein the protective plate is a multilayer plate with at least three layers arranged adjacent to one another, with two outer layers and with at least one inner layer arranged between the two outer layers, and the at least one inner layer being configured to be compressed and, during compression, generates a noise characteristic of mechanical impairment of the protective plate and (ii) an acoustic monitoring device, said method comprising:

acoustically monitoring the protective plate using the acoustic monitoring device;

in an event of mechanical impairment of the protective plate, registering the mechanical impairment by way of the monitoring device on a basis of the noise characteristic of mechanical impairment of the protective plate; and outputting a signal by way of the monitoring device.

15. The method as claimed in claim 14, wherein, on the basis of the signal, the method further comprises the step of automatically carrying out a driver warning and/or a fault memory entry and/or a workshop notification and/or a fire department notification and/or an emergency call and/or warning signals to surrounding road users and/or a disconnection of a high-voltage connection and/or an activation of a hazard warning flasher system.

16. The method as claimed in claim 14, wherein the acoustic monitoring device comprises at least one sound sensor and/or acoustic sensor and/or microphone which acoustically monitors or monitor the protective plate, wherein the method further comprises the step of evaluating the signal of the monitoring device to identify a characteristic noise.

\* \* \* \* \*